May 23, 1939.                P. E. KNUDSEN                 2,159,661
                           DOUBLE GLAZED WINDOW
                           Filed March 1, 1938
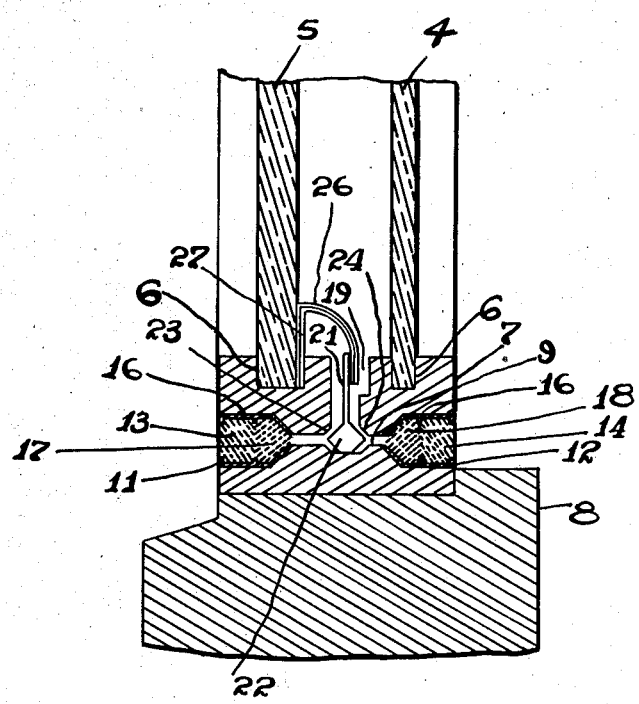
INVENTOR.
P.E. KNUDSEN
BY Bradley & Bee
ATTORNEYS.

Patented May 23, 1939

2,159,661

UNITED STATES PATENT OFFICE 2,159,661

DOUBLE GLAZED WINDOW

Percy E. Knudsen, Pittsburgh, Pa., assignor to Pittsburgh Plate Glass Company, Allegheny County, Pa., a corporation of Pennsylvania Application March 1, 1938, Serial No. 193,297

9 Claims. (Cl. 20—56.5)

The present invention relates to window constructions notably of the double glazed type in which two or more panes of glass are disposed in a suitable frame in spaced parallel relation with respect to each other in order to provide a dead air space of low heat conductivity.

One object of the invention is to obviate condensation of moisture and resultant staining action upon the inner surfaces of the sheets of glass comprising double glazed windows.

A second object of the invention is to provide apparatus for effecting the foregoing purpose which is automatic in its operation and requires little or no attention upon the part of the users of the constructions.

A common form of double glazed window construction comprises a pair of spaced parallel sheets or panes of glass suitably secured together in a frame thereby providing a dead air space or chamber which effectively insulates the units against the transmission of heat of convection or conduction. In such units considerable difficulty is occasioned by a tendency of water vapor to get between the sheets of glass and to condense upon the inner surfaces thereof. Such condensed vapor of course tends to obscure vision through units; furthermore, the water seems to attack or decompose the surface film of glass thus occasioning permanent stains. In order to obviate this condensation of water vapor it has been proposed to provide openings preferably through the frame of the units into the dead air space thus permitting sufficient circulation of the air to remove by evaporation any water which has accumulated upon the surface of the glass.

Such constructions obviates the formation of permanent films of water vapor, but it sometimes happens that the atmosphere upon one side of the units will be relatively warm and saturated with water vapor while the atmosphere upon the other side is at a substantially lower temperature. If air from the warm side passes into the air space between the sheets of glass and contacts with the glass upon the cold side, temporary condensation of moisture may occur. Repeated condensations will then produce blooming or efflorescence of the glass. This effect is particularly likely to occur in double glazed units which are employed in air-conditioned buildings where the temperature is relatively constant and the atmosphere within the buildings during the summer months may be substantially colder and drier than the atmosphere outside of the building, while in the winter time conditions are reversed. In the usual constructions it is impossible to insure that the air will always be circulated into the units from the cold side in such manner that it will be warmed upon entrance into the air chamber, and therefore will not tend to deposit moisture.

In a unit constructed in accordance with the provisions of the present invention openings are provided in the double glazed units extending from opposite sides thereof into the dead air chamber and a thermostatically-controlled valve is provided which is so constructed as automatically to prevent the entrance of air from the warmer side of the glass when the temperature of the atmosphere about the building fluctuates.

In the drawing in which like numerals refer to like parts throughout a double glazed unit constructed in accordance with the provisions of the present invention comprises a pair of spaced sheets of glass 4 and 5, the former of which may be somewhat thinner than the latter and preferably constitute the interior pane in the unit. The panes are disposed in grooves 6 in a frame 7, which, as shown in the drawing, is solid or unitary. However, if desired, the frame may comprise outer and inner sections suitably hinged together along one edge in such manner that should occasion arise the unit may be opened up to permit cleaning of the inner surfaces thereof. The frames may be designed for vertically sliding in suitable casements or if preferred they may be of the conventional casement type and hinged at one edge to permit them to swing open. As shown in the drawing the frame 7 rests at its lower edge upon a sill or ledge 8 of conventional design and constitutes a part of a building which preferably is air conditioned.

Air is admitted to the space between the sheets of glass 4 and 5 by means of a passage or duct 9 extending through the bottom portion of frame 7 and having expanded portions 11 and 12 at opposite ends thereof for the reception of filter plugs 13 and 14 formed of a suitable porous material, for example, of porous porcelain or the like in housings 16. Packings 17 and 18 of hygroscopic material such as activated alumina are secured in the space back of the plugs 13 and 14 and act partially or completely to dehydrate air which circulates through the passageway 9.

Plugs 13, 14 and packings 17, 18 can readily be removed from housings 16 for replacement, or if preferred the housing plugs and packings can be removed as units and replaced by fresh units.

A vertical opening 19 in frame 8 provides a duct or passage between the dead air space between the panes and passage 9, and the stem 21 of a valve 22 is disposed therein. This valve on opposite sides is of conical contour and is designed selectively to mate with corresponding countersunk seating portions 23 and 24 at the junction between passageway 9 and the vertical passageway 19.

The position of valve 22 is controlled by means of a thermostatic element, for example, a bymetallic unit 26 having one extremity thereof secured by welding, or by screws, to the stem 21 of the valve and having the other extremity 27 bent downwardly in contact with the outer sheet of glass 5 and clamped by the latter in groove 6. Usually the temperature within a building is fairly constant and the characteristics of the bymetallic element are so selected that as the external atmosphere about the outer pane 5 fluctuates with respect to the atmosphere about the inner pane 4 the position of the valve 23 will be changed to insure that only the colder air is admitted to the interior of the unit.

The mode of operation of the construction herein disclosed is practically self evident from the foregoing description. It will be assumed for purposes of illustration that the atmosphere outside of the building in which the units are employed is substantially colder than the atmosphere within the building. Under such conditions the metallic element 26 will tend to straigten out, thus causing the valve 22 to move inwardly, to prevent the admission of relatively warm air from the interior of the building. The cold dry air from the exterior of course when it enters the space between the sheets 4 and 5 will tend to become warm and therefore its capacity to retain water vapor will be increased, and there can be no deposition of surface film of moisture upon the glass.

Similarly, if the interior of the building is colder than the exterior, as often occurs in air-conditioned buildings, the by-metallic element 26 which is in contact with glass 5 will become warm and will cause the valve 22 to swing outwardly to close the unit to the relatively warm external atmosphere. In event that the atmosphere upon opposite sides of the units are at substantially the same temperatures the valve 22 will assume a neutral position in which the entrance of air from both sides of the units is permitted.

The principal advantage of the above described construction resides in the fact that the operation of the valve for controlling the admission of air to the units is entirely automatic, thus precluding the possibility of neglect upon the part of the occupants of the building and assuring that at all times the interior surfaces of the sheets of glass in the unit will be free of moisture and that there will be no tendency to cause blooming or effloresence of the glass.

Although only a preferred form of the invention has been shown and described, it will be apparent to those skilled in the art that numerous modifications may be made therein without departure from the spirit of the invention or the scope of the appended claims.

What I claim is:

1. A multi-glazed window construction comprising a plurality of sheets of glass secured in spaced parallel relation in a frame to provide a dead air chamber, said frame having inlets formed therein and providing communication between opposite sides of the window and the dead air space between the sheets of glass, valve mechanism disposed selectively to prevent entrance of air from one side of the unit, and temperature-controlled means for operating the valve to prevent air from entering the unit from the warmer side thereof.

2. A construction as defined in claim 1 in which the temperature-controlled means is governed by the temperature of the external sheet of glass.

3. A construction as defined in claim 1 in which the temperature-controlled means comprises a bimetallic element having one extremity secured to the valve and having the other extremity maintained in contact with the external sheet of glass.

4. A construction as defined in claim 1 in which porous filter plugs are disposed in the passageways.

5. A construction as defined in claim 1 in which dehydrating units are disposed in the passageways.

6. A building construction comprising a window having spaced inner and outer sheets of glass, air ducts connecting the space between the sheets respectively with the atmosphere within the building and the external atmosphere, a valve in the ducts and a thermostat for actuating the valve selectively to close one of the ducts, depending upon the external temperature about the building.

7. A construction as defined in claim 6 in which the thermostat comprises a thermally sensitive actuating element in contact with the outer sheet of glass.

8. A construction as defined in claim 6 in which the building is air conditioned.

9. A construction as defined in claim 1 in which the thermally responsive element is in contact with the lower portion of the outer sheet of glass.

PERCY E. KNUDSEN.